United States Patent
Nagayama

(10) Patent No.: US 12,215,484 B2
(45) Date of Patent: Feb. 4, 2025

(54) HYDRAULIC MOTOR UNIT

(71) Applicant: Nabtesco Corporation, Tokyo (JP)

(72) Inventor: Hiromi Nagayama, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/501,669

(22) Filed: Nov. 3, 2023

(65) Prior Publication Data

US 2024/0191475 A1     Jun. 13, 2024

(30) Foreign Application Priority Data

Dec. 8, 2022 (JP) .................................. 2022-196285

(51) Int. Cl.
| | |
|---|---|
| E02F 9/22 | (2006.01) |
| F15B 11/044 | (2006.01) |
| F16H 61/4157 | (2010.01) |
| F16H 61/421 | (2010.01) |
| F16H 61/423 | (2010.01) |

(52) U.S. Cl.
CPC .......... *E02F 9/2285* (2013.01); *E02F 9/2228* (2013.01); *E02F 9/2253* (2013.01); *E02F 9/2289* (2013.01); *F15B 11/0445* (2013.01); *F16H 61/4157* (2013.01); *F16H 61/421* (2013.01); *F16H 61/423* (2013.01)

(58) Field of Classification Search
CPC ..... E02F 9/2253; E02F 9/2285; E02F 9/2289; F16H 61/4157; F16H 61/421; F16H 61/423; F15B 11/0445
See application file for complete search history.

(56) References Cited

U.S. PATENT DOCUMENTS

| | | | | |
|---|---|---|---|---|
| 6,619,184 | B1 * | 9/2003 | Legner | ................... F16D 55/02 91/476 |
| 2009/0094976 | A1 * | 4/2009 | Yatabe | .................... E02F 9/128 60/489 |
| 2011/0283692 | A1 * | 11/2011 | Satake | ................... F15B 11/08 60/460 |
| 2014/0372001 | A1 * | 12/2014 | Rozycki | ................. F16H 61/42 701/58 |
| 2020/0002922 | A1 * | 1/2020 | Fukuda | ................. E02F 9/2253 |

FOREIGN PATENT DOCUMENTS

| | | | | |
|---|---|---|---|---|
| JP | 02176025 A | * | 7/1990 | ........... F16H 61/421 |
| JP | 6690855 B2 | | 4/2020 | |

OTHER PUBLICATIONS

JP 02176025 A machine translation thereof (Year: 1990).*

* cited by examiner

*Primary Examiner* — Kenneth Bomberg
*Assistant Examiner* — Matthew Wiblin
(74) *Attorney, Agent, or Firm* — F;Pillsbury Winthrop Shaw Pittman, LLP

(57) ABSTRACT

An oil pressure motor unit according to an aspect of the disclosure includes: an oil pressure motor having an output shaft and a brake; a two-speed switching valve for switching a speed of the output shaft; and a brake release actuator for releasing braking of the brake. The oil pressure motor is connected to a first channel and a second channel each conveying a hydraulic fluid for driving. One of the hydraulic fluids conveyed by the first channel and the second channel conveyed under a lower pressure is supplied separately to the brake release actuator and the two-speed switching valve.

6 Claims, 2 Drawing Sheets

HYDRAULIC MOTOR UNIT

CROSS-REFERENCE TO RELATED APPLICATIONS

This application is based on and claims the benefit of priority from Japanese Patent Application Serial No. 2022-196285 (filed on Dec. 8, 2022), the contents of which are hereby incorporated by reference in their entirety.

TECHNICAL FIELD

The present disclosure relates to a hydraulic motor unit.

BACKGROUND

A machine vehicle such as a hydraulic excavator is equipped with multiple oil pressure motors as hydraulic pumps. Some of these oil pressure motors, especially those for traveling, are integrated with a brake for braking and a speed change mechanism for switching the speed. Generally, the brake for braking and the speed change mechanism for switching the speed are connected with two independent pilot oil passages extending from outside the oil pressure motor and are driven by the pressure of the hydraulic oil in the respective pilot oil passages. Therefore, pipes are required to form each of the pilot oil passages. As a result, parts such as solenoid proportional valves that control the pressure of the hydraulic oil in each pilot oil passage are required independently.

In an attempt to reduce the number of pipes and parts, a technique is disclosed in which, for example, a brake for braking and a speed change mechanism for controlling the speed are connected to a common solenoid proportional valve through pilot oil passages (e.g., Japanese Patent No. 6690855). In this technique, the brake and speed change mechanism are controlled by the common proportional valve.

However, the common solenoid proportional valve, for example, is provided outside the oil pressure motor. Therefore, the two pipes forming the pilot oil passages need to be connected independently from the outside of the oil pressure motor to the brake and the speed change mechanism. Therefore, it is desirable to further reduce the number of pipes and parts.

SUMMARY

The present disclosure provides a hydraulic motor unit capable of reducing the number of pipes connected from the outside.

To overcome the above problem, aspects of the present disclosure are configured as follows. A hydraulic motor unit according to one aspect of the disclosure comprises: a hydraulic motor having an output shaft and a brake for braking the output shaft; a two-speed switching valve for switching a speed of the output shaft; and a brake actuator for releasing braking of the brake, wherein the hydraulic motor is connected to a first channel and a second channel each conveying a hydraulic fluid for driving, and wherein one of the hydraulic fluids conveyed by the first channel and the second channel conveyed under a lower pressure, which is a low-pressure hydraulic fluid, is supplied separately to the brake actuator and the two-speed switching valve.

The hydraulic motor unit including the brake actuator and the two-speed switching valve integrated together into a unit is configured such that the hydraulic fluid under a lower pressure can be selected from hydraulic fluids conveyed by the first channel and the second channel inside the hydraulic motor unit. One of the hydraulic fluids conveyed by the first channel and the second channel conveyed under a lower pressure is supplied separately to the brake actuator and the two-speed switching valve. This configuration allows the pilot channel that supplies the hydraulic fluid under a lower pressure separately to the brake actuator and the two-speed switching valve to be housed inside the hydraulic motor unit. Therefore, the number of pipes connected from outside the hydraulic motor unit can be reduced.

The hydraulic motor unit described above may further comprise: a low-pressure selector valve connected to the first channel and the second channel; and at least one proportional valve connected to a third channel downstream of the low-pressure selector valve, wherein the low-pressure hydraulic fluid may be supplied separately to the brake actuator and the two-speed switching valve through a pilot channel connected to the at least one proportional valve.

In the hydraulic motor unit described above, the hydraulic motor may be connected in a closed circuit with a hydraulic pump connected to the first channel and the second channel to form an HST circuit, and the at least one proportional valve may be housed inside the HST circuit.

In the hydraulic motor unit described above, the at least one proportional valve may comprise one proportional valve, and the pilot channel may be branched in a middle thereof to supply the low-pressure hydraulic fluid to the brake actuator and the two-speed switching valve.

A hydraulic motor unit according to another aspect of the disclosure comprises: a hydraulic motor having an output shaft and a brake for braking the output shaft; a two-speed switching valve for switching a speed of the output shaft; and a brake actuator for releasing braking of the brake, wherein the hydraulic motor is connected to a first channel and a second channel each conveying a hydraulic fluid for driving by a hydraulic pump, and the hydraulic motor is connected in a closed circuit with the hydraulic pump to form an HST circuit, and wherein the hydraulic motor unit further comprises: a low-pressure selector valve connected to the first channel and the second channel and configured to select a low-pressure hydraulic fluid under a lower pressure from the hydraulic fluids conveyed by the first channel and the second channel; and one proportional valve connected to a third channel downstream of the low-pressure selector valve and housed inside the HST circuit, and wherein the hydraulic fluid under a lower pressure is branched and supplied to the brake actuator and the two-speed switching valve through a pilot channel connected to the proportional valve.

Typically, a low-pressure selector valve may be housed inside a hydraulic motor unit. Therefore, a proportional valve can be housed inside the hydraulic motor unit by connecting the proportional valve to the middle of the channel downstream of the low-pressure selector valve. The hydraulic fluid is branched and supplied to the brake actuator and the two-speed switching valve through the pilot channel connected to the proportional valve. The brake actuator and the two-speed switching valve are typically housed inside the hydraulic motor unit. This arrangement allows the pilot channel to be housed inside the hydraulic motor unit. This configuration reduces the number of pipes connected from outside the hydraulic motor unit.

The pilot channel that branches and supplies the hydraulic fluid under a lower pressure to the brake actuator and the two-speed switching valve by the proportional valve can be housed inside an HST circuit. The first and second channels can be housed inside the HST circuit. This configuration further reduces the number of pipes connected from outside the HST circuit.

According to the present disclosure, it is possible to reduce the number of pipes connected from the outside.

DESCRIPTION OF THE EMBODIMENTS

An oil pressure motor unit 10 relating to an embodiment of the present disclosure will be hereinafter described with reference to the drawings.

<Oil Pressure System>

Figure 1:
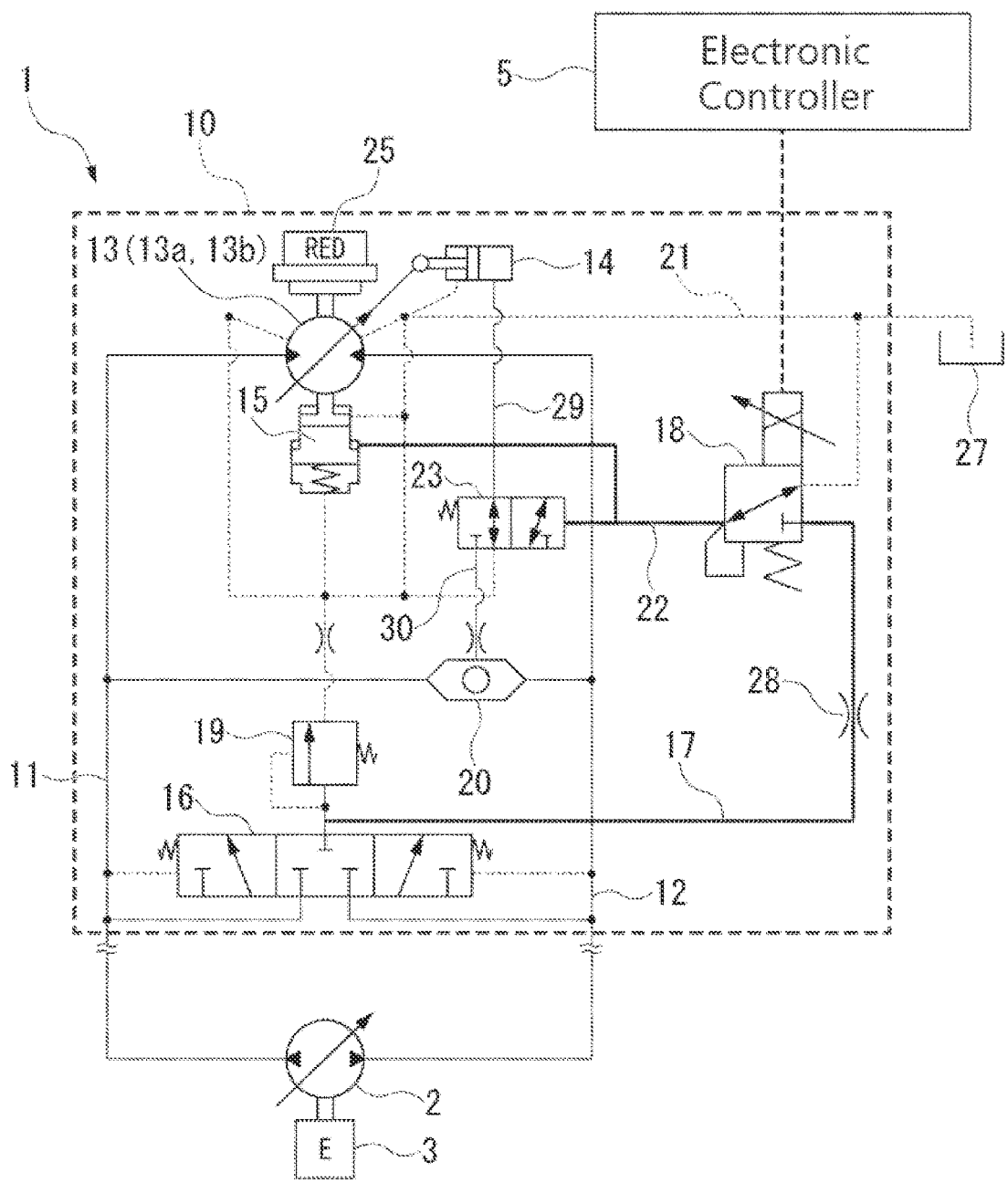
FIG. 1 schematically illustrates an oil pressure system relating to an embodiment of the present disclosure.

FIG. 1 schematically shows an oil pressure system 1. As shown in FIG. 1, the oil pressure system 1 includes an oil pressure pump (an example of the hydraulic pump in the claims) 2 and an oil pressure motor unit (an example of the hydraulic motor unit in the claims) 10 connected to the oil pressure pump 2.

The oil pressure system 1 is installed in a machine vehicle such as a hydraulic excavator (not shown), for example, to drive an undercarriage of the machine vehicle. The oil pressure pump 2 is connected to an engine 3 serving as a power source. The oil pressure pump 2 rotates by driving of the engine 3. As the oil pressure pump 2 rotates, the hydraulic oil is discharged. The hydraulic oil causes rotation of the oil pressure motor (an example of the hydraulic motor in the claims) 13 of the oil pressure motor unit 10.

<Oil Pressure Motor Unit>

The oil pressure motor unit 10 includes the oil pressure motor 13, a speed change actuator 14 and a brake release actuator (an example of the brake actuator in the claims) 15, a low-pressure selector valve (an example of the low-pressure selector valve in the claims) 16, a solenoid proportional valve (an example of the proportional valve in the claims) 18, a flushing valve 19, a high-pressure selector valve 20, and a two-speed switching valve (an example of the two-speed switching valve in the claims) 23. The oil pressure motor 13 is connected to the oil pressure pump 2 through a first main oil passage (an example of the first channel in the claims) 11 and a second main oil passage (an example of the second channel in the claims) 12. The speed change actuator 14 and the brake release actuator 15 are provided on the oil pressure motor 13. The low-pressure selector valve 16 is connected to the first main oil passage 11 and the second main oil passage 12. The solenoid proportional valve 18 is connected to the middle of the oil passage (an example of the third channel in the claims) 17 downstream of the low-pressure selector valve 16. The flushing valve 19 is connected to the oil passage 17 downstream of the low-pressure selector valve 16. The high-pressure selector valve 20 is connected to the first main oil passage 11 and the second main oil passage 12. The two-speed switching valve 23 is connected to the high-pressure selector valve 20, a drain oil passage 21, a pilot oil passage (an example of the pilot channel in the claims) 22, and the speed change actuator 14.

The speed change actuator 14, the brake release actuator 15, the low-pressure selector valve 16, the solenoid proportional valve 18, the flushing valve 19, the high-pressure selector valve 20, and the two-speed switching valve 23 are housed inside the oil pressure motor unit 10. In other words, the oil pressure motor unit 10 includes the speed change actuator 14, the brake release actuator 15, the low-pressure selector valve 16, the solenoid proportional valve 18, the flushing valve 19, the high-pressure selector valve 20, and the two-speed switching valve 23, which are all integrated into a unit together with the oil pressure motor 13. The reason that the solenoid proportional valve 18 can be housed inside the oil pressure motor unit 10 will be explained in detail later.

<Oil Pressure Motor>

The oil pressure motor 13 is a unitary motor provided in the oil pressure motor unit 10. The oil pressure motor 13 is connected to the first main oil passage 11 and the second main oil passage 12, and is connected to the oil pressure pump 2 through the first main oil passage 11 and the second main oil passage 12. The oil pressure motor 13 is connected in a closed circuit with the oil pressure pump 2, the first main oil passage 11, and the second main oil passage 12 to form what is called an HST (Hydro Static Transmission) circuit. In other words, the HST circuit refers to a configuration in which the oil pressure motor 13 and the oil pressure pump 2 are connected in a closed circuit through the first main oil passage 11 and the second main oil passage 12.

The oil pressure motor 13 rotates when the oil pressure pump 2 is driven to discharge the hydraulic oil (an example of the hydraulic fluid in the claims) into one of the first main oil passage 11 and the second main oil passage 12. In this case, the pressure of the hydraulic oil in one of the first and second main oil passages 11 and 12 is higher than the pressure of the hydraulic oil in the other. The oil pressure motor 13 is a motor for traveling of the machine vehicle. An output shaft 13a of the oil pressure motor 13 is connected to the undercarriage of the machine vehicle via a speed reducer 25. Therefore, the oil pressure pump 2 drives the oil pressure motor 13, and the oil pressure pump 13 in turn drives the undercarriage for traveling of the machine vehicle.

The oil pressure motor 13 is, for example, a swash plate oil pressure motor (axial piston oil pressure motor) having a swash plate (not shown) as a speed change mechanism. The swash plate as the speed change mechanism is connected to the speed change actuator 14 described later. The oil pressure motor 13 includes a brake 13b for braking the output shaft 13a of the oil pressure motor 13. In FIG. 1, the circuit diagram symbol (JIS symbol) of the oil pressure motor 13 is shown for convenience of explanation. The circuit diagram symbol representing the oil pressure motor 13 includes the output shaft 13a and the brake 13b. The brake 13b is connected to the brake release actuator 15 described later.

<Speed Change Actuator>

The speed change actuator 14 is connected downstream of the two-speed switching valve 23 described later. The speed change actuator 14 uses the hydraulic oil directed from the two-speed switching valve 23 to adjust the inclination angle (angle of slope) of the swash plate, thereby switching the oil pressure motor 13 between two speeds, low and high.

<Brake Release Actuator>

The brake release actuator 15 is connected downstream of the solenoid proportional valve 18 described later. Specifically, the brake release actuator 15 is connected to one of the branch oil passages of the pilot oil passage 22 connected downstream of the solenoid proportional valve 18. The brake release actuator 15 releases the braking of the brake 13b on the output shaft 13a of the oil pressure motor 13 by the hydraulic oil directed from the solenoid proportional valve 18. The braking of the brake 13b on the output shaft 13a of the oil pressure motor 13 is hereinafter simply referred to as the braking of the oil pressure motor 13.

<Low-Pressure Selector Valve>

The low-pressure selector valve 16 is connected to the first main oil passage 11 and the second main oil passage 12 upstream of the oil pressure motor 13. The low-pressure selector valve 16 selects the hydraulic oil under a lower pressure (an example of the low-pressure hydraulic fluid in the claims) from the hydraulic oils directed through the first main oil passage 11 and the second main oil passage 12 and directs the selected hydraulic oil to the oil passage 17 downstream of the low-pressure selector valve 16. Specifically, when, for example, the hydraulic pressure of the first main oil passage 11 is higher than that of the second main oil passage 12 and exceeds a setting value, the low-pressure selector valve 16 directs the hydraulic oil of the second main oil passage 12 to the solenoid proportional valve 18 and the flushing valve 19 through the oil passage 17. When, for example, the hydraulic pressure of the second main oil passage 12 is higher than that of the first main oil passage 11 and exceeds the setting value, the low-pressure selector valve 16 directs the hydraulic oil of the first main oil passage 11 to the solenoid proportional valve 18 and the flushing valve 19 through the oil passage 17.

<Solenoid Proportional Valve>

The solenoid proportional valve 18 is connected to the middle of the oil passage 17, and is also connected to a tank 27 via the drain oil passage 21 and also to the pilot oil passage 22. The pilot oil passage 22 branches in the middle into two branch oil passages. One of the branch oil passages of the pilot oil passage 22 is connected to the brake release actuator 15. The other of the branch oil passages of the pilot oil passage 22 is connected to the two-speed switching valve 23. Thus, the solenoid proportional valve 18 is connected to the brake release actuator 15 and the two-speed switching valve 23 via the pilot oil passage 22. The solenoid proportional valve 18 supplies the hydraulic oil under a lower pressure selected by the low-pressure selector valve 16 to the brake release actuator 15 and the two-speed switching valve 23.

The solenoid proportional valve 18 is electrically connected to the electronic controller 5 (described later) and is operated by an electrical signal from the electronic controller 5. The electronic controller 5 outputs an electrical signal to the solenoid proportional valve 18, for example, when an operator handles an operation unit. When no input signal is received from the electronic controller 5, the solenoid proportional valve 18 maintains the pilot oil passage 22 and the drain oil passage 21 in the open position and the oil passage 17 in the closed position. The solenoid proportional valve 18 increases or decreases the degree of opening of the pilot oil passage 22 and the oil passage 17 steplessly according to the increase or decrease of the input signal from the electronic controller 5.

The reason that the solenoid proportional valve 18 can be housed inside the oil pressure motor unit 10 will now be explained. The solenoid proportional valve 18 is connected to the middle of the oil passage 17 downstream of the low-pressure selector valve 16. The low-pressure selector valve 16 is housed inside the oil pressure motor unit 10. This arrangement allows the solenoid proportional valve 18 to be housed inside the oil pressure motor unit 10.

The brake release actuator 15 and the two-speed switching valve 23 are also housed inside the oil pressure motor unit 10. This arrangement allows the pilot oil passage 22 to be housed inside the oil pressure motor unit 10. An orifice 28 is connected to the middle of the oil passage 17 upstream of the solenoid proportional valve 18. Thus, for example, the pressure of the hydraulic oil directed through the oil passage 17 can be adjusted by the orifice 28, such that the hydraulic oil under an adjusted pressure can be directed to the solenoid proportional valve 18.

<Flushing Valve>

When the hydraulic pressure in the oil passage 17 exceeds a setting value, the flushing valve 19 returns (discharges) the hydraulic oil in the oil passage 17 to the tank 27 via the drain oil passage 21. By returning the hydraulic oil in the oil passage 17 to the tank 27, the heat of the hydraulic oil in the first and second main oil passages 11 and 12 can be released to the outside to maintain the temperature of the hydraulic oil suitably.

<High-Pressure Selector Valve>

The high-pressure selector valve 20 is connected to the first main oil passage 11 and the second main oil passage 12, and further to the two-speed switching valve 23. The high-pressure selector valve 20 directs the hydraulic oil under a higher pressure from the first main oil passage 11 or the second main oil passage 12 to the two-speed switching valve 23.

<Two-Speed Switching Valve>

The two-speed switching valve 23 is connected to the high-pressure selector valve 20, the drain oil passage 21, the pilot oil passage 22 (specifically, the other of the branch oil passages), and the oil passage 29 to the speed change actuator 14. When the pressure of the hydraulic oil in the pilot oil passage 22 is lower than the setting value, the two-speed switching valve 23 is maintained in a position for opening the oil passage 29 connected to the speed change actuator 14 and the drain oil passage 21.

When the pressure of the hydraulic oil in the pilot oil passage 22 exceeds the set value, the two-speed switching valve 23 is maintained in a position for opening the oil passage 30 connected to the high-pressure selector valve 20 and the oil passage 29 connected to the speed change actuator 14. The hydraulic oil under a higher pressure selected by the high-pressure selector valve 20 is directed to the speed change actuator 14 through the two-speed switching valve 23. Thus, the speed change actuator 14 adjusts the swash plate of the oil pressure motor 13 to change the volume (displacement, flow rate, discharge flow rate) of the oil pressure motor 13. In other words, the two-speed switching valve 23 is a valve that can switch the rotation speed (an example of the speed in the claims) of the output shaft 13a of the oil pressure motor 13.

<Operation of Oil Pressure Motor Unit>

The following describes how the oil pressure motor unit 10 operates, with reference to FIG. 1. As shown in FIG. 1, the engine 3 drives the oil pressure pump 2. The oil pressure pump 2 drives, for example, to discharge the hydraulic oil into the first main oil passage 11 and to suck in the hydraulic oil from the second main oil passage 12. This causes the pressure of the hydraulic oil in the first main oil passage 11 to be higher than the pressure of the hydraulic oil in the second main oil passage 12, and the oil pressure motor 13 of the oil pressure motor unit 10 rotates.

In this state, when no operation signal is input from the electronic controller 5 to the solenoid proportional valve 18, the solenoid proportional valve 18 maintains the pilot oil passage 22 and the drain oil passage 21 in the open position and the oil passage 17 in the closed position. Thus, the brake release actuator 15 is maintained inactive, and the hydraulic motor 13 is maintained in a braked state by the brake 13b. The two-speed switching valve 23 is maintained in the position for opening the oil passage 29 of the speed change actuator 14 and the drain oil passage 21. Thus, the swash plate of the speed change mechanism is maintained in the low-speed position by the speed change actuator 14. In other words, the oil pressure motor 13 is maintained in a stopped state in which its rotation is stopped.

The solenoid proportional valve 18 increases or decreases the degree of opening of the pilot oil passage 22 and the oil passage 17 steplessly according to the operation signal from the electronic controller 5. Therefore, when the electronic controller 5 starts inputting the operation signal to the solenoid proportional valve 18, the pilot oil passage 22 and the oil passage 17 start to open. As a result, the pressure of the hydraulic oil in the pilot oil passage 22 is adjusted by the solenoid proportional valve 18 to lower than a first prescribed value. In this state, the oil pressure motor is still maintained in a braked state by the brake release actuator 15. The swash plate of the speed change mechanism is maintained in the low-speed position by the speed change actuator 14. In other words, the oil pressure motor 13 is maintained in a stopped state in which its rotation is stopped.

In this state, the amount of adjustment of the solenoid proportional valve 18 by the electronic controller 5 is increased, such that the pressure of the hydraulic oil in the pilot oil passage 22 is adjusted to be equal to or higher than the first prescribed value and lower than a second prescribed value. Therefore, the oil pressure motor 13 is maintained in a brake released state by the brake release actuator 15. The swash plate of the speed change mechanism is maintained in the low-speed position by the speed change actuator 14. Thus, the oil pressure motor 13 is maintained in a state in which it rotates at a low speed. The undercarriage of the machine vehicle is driven by the oil pressure motor 13 and travels at a low speed.

In this state, the amount of adjustment of the solenoid proportional valve 18 by the electronic controller 5 is further increased, such that the pressure of the hydraulic oil in the pilot oil passage 22 is adjusted to be equal to or higher than the second prescribed value. Therefore, the oil pressure motor 13 is continuously maintained in the brake released state by the brake release actuator 15. The swash plate of the speed change mechanism is maintained in the high-speed position by the speed change actuator 14. Thus, the oil pressure motor 13 is maintained in a state in which it rotates at a high speed. The undercarriage of the machine vehicle is driven by the oil pressure motor 13 and travels at a high speed.

As described above, in the oil pressure motor unit 10 of the embodiment, the oil pressure motor 13 is integrated with the brake release actuator 15 and the two-speed switching valve 23 into a unit. The oil pressure motor unit 10 is configured such that the hydraulic oil under a lower pressure can be selected from the first main oil passage 11 and the second main oil passage 12 inside the oil pressure motor unit 10. The brake release actuator 15 and the two-speed switching valve 23 are housed inside the oil pressure motor unit 10 and thereby integrated into a unit.

In addition, the hydraulic oil under a lower pressure is selected inside the oil pressure motor unit 10, and the hydraulic oil is branched and supplied to the brake release actuator 15 and the two-speed switching valve 23 which are housed inside the oil pressure motor unit 10. This configuration reduces the number of pipes connected from outside the oil pressure motor unit 10. One solenoid proportional valve 18 is connected to the middle of the oil passage 17, and the pilot oil passage 22 connected downstream of the solenoid proportional valve 18 is branched to supply the hydraulic oil to the brake release actuator 15 and the two-speed switching valve 23. Since only one solenoid proportional valve 18 is needed to supply the hydraulic oil to the brake release actuator 15 and the two-speed switching valve 23, the number of parts can be reduced.

The low-pressure selector valve 16 is housed inside the oil pressure motor unit 10. Therefore, with the solenoid proportional valve 18 provided downstream of the low-pressure selector valve 16, the solenoid proportional valve 18 can be housed inside the oil pressure motor unit 10. The solenoid proportional valve 18 directs the hydraulic oil under a lower pressure selected by the low-pressure selector valve 16 to the pilot oil passage 22. The pilot oil passage 22 branches and supplies the hydraulic oil directed from the solenoid proportional valve 18 to the brake release actuator 15 and the two-speed switching valve 23. The brake release actuator 15 and the two-speed switching valve 23 are housed inside the oil pressure motor unit 10. This arrangement allows the pilot oil passage 22 to be housed inside the oil pressure motor unit 10. This configuration reduces the number of pipes connected from outside the oil pressure motor unit 10.

The oil pressure pump 2 and the oil pressure motor 13 are connected in a closed circuit to form an HST circuit. Therefore, it is possible to house the pilot oil passage 22 inside the HST circuit, the pilot oil passage 22 being configured to branch and supply the hydraulic oil directed from the solenoid proportional valve 18 to the brake release actuator 15 and the two-speed switching valve 23. The first and second main oil passages 11 and 12 are housed inside the HST circuit. This configuration further reduces the number of pipes connected from outside the HST circuit.

Variations

The technical scope of the present disclosure is not limited to the embodiment described above but is susceptible of various modification within the purport of the present disclosure.

Figure 2:
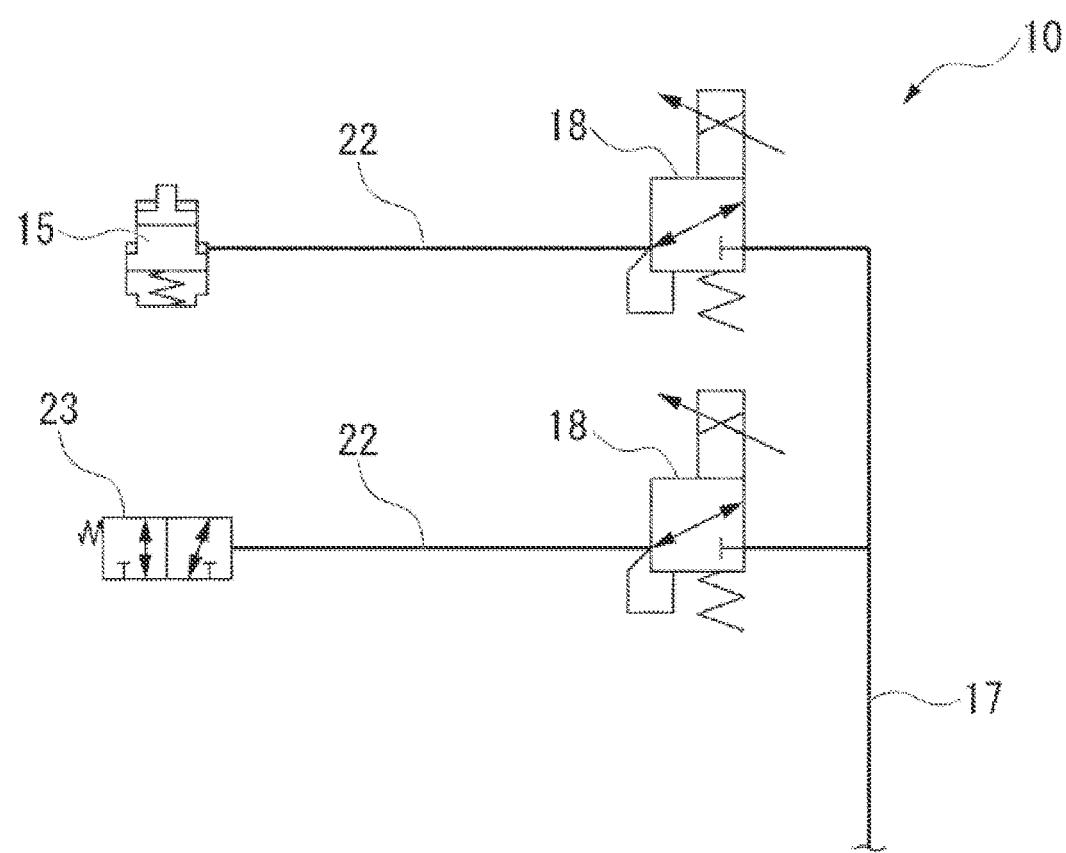
FIG. 2 schematically illustrates a part of a variation of an oil pressure motor unit relating to an embodiment of the present disclosure.

FIG. 2 schematically illustrates a part of a variation of the oil pressure motor unit 10. In the embodiment described above, the solenoid proportional valve 18 is connected to the middle of the oil passage 17 downstream of the low-pressure selector valve 16. However, this configuration is not limitative. For example, as shown in FIG. 2, the oil passage 17 downstream of the low-pressure selector valve 16 can be branched in the middle into the oil passages to the brake release actuator 15 and the two-speed switching valve 23, and independent solenoid proportional valves 18 can be connected to the branched oil passages, respectively. In other words, the solenoid proportional valve 18 for the brake release actuator 15 and the solenoid proportional valve 18 for the two-speed switching valve 23 can be connected independently.

In the embodiment described above, the hydraulic oil under a higher pressure selected by the high-pressure selector valve 20 is directed to the speed change actuator 14 through the two-speed switching valve 23. However, this configuration is not limitative. For example, the high-pressure selector valve 20 and the two-speed switching valve 23 can be eliminated, and the pilot oil passage 22 can be connected to the speed change actuator 14.

In the embodiment described above, the solenoid proportional valve 18 is connected to the middle of the oil passage 17 downstream of the low-pressure selector valve 16. However, this configuration is not limitative. For example, the solenoid proportional valve 18 can be replaced with a switching valve connected to the middle of the oil passage 17 downstream of the low-pressure selector valve 16.

In the embodiment described above, the orifice 28 is connected to the middle of the oil passage 17 upstream of the solenoid proportional valve 18. However, this configuration is not limitative. For example, an orifice can be connected to the pilot oil passage 22 downstream of the solenoid proportional valve 18, in addition to the orifice provided upstream of the solenoid proportional valve 18. Thus, for example, the pressure of the hydraulic oil in the pilot oil passage 22 can be adjusted by the orifice, and the adjusted hydraulic oil can be directed to the brake release actuator 15 and the two-speed switching valve 23.

In the embodiment described above, the oil pressure system 1 is installed in a machine vehicle such as for example a hydraulic excavator (not shown). However, this configuration is not limitative. The oil pressure system 1 can be employed in various machine vehicles and in various oil pressure devices other than mechanical vehicles.

In the embodiment described above, the oil pressure pump 2 for discharging the hydraulic oil is taken as an example of the hydraulic pump. The oil pressure motor 13 driven by the hydraulic oil is taken as an example of the hydraulic motor. The oil pressure motor unit 10 is taken as an example of the hydraulic motor unit with a hydraulic pump and a hydraulic motor. However, these examples are not limitative. It is also possible to employ hydraulic pumps for discharging various liquids other than the hydraulic oil. It is also possible to employ hydraulic motors driven by various liquids other than the hydraulic oil. It is also possible to apply the configuration of the oil pressure motor unit 10 to hydraulic motor units using various liquids other than the hydraulic oil.

The elements of the embodiments described above may be replaced with known elements within the purport of the present disclosure. The variations described above may be combined.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

What is claimed is:

1. A hydraulic motor unit, comprising:
a hydraulic motor having an output shaft and a brake for braking the output shaft;
a two-speed switching valve for switching a speed of the output shaft; and
a brake actuator for releasing braking of the brake,
wherein the hydraulic motor is connected to a first channel and a second channel each conveying a hydraulic fluid for driving, and
wherein one of the hydraulic fluids conveyed by the first channel and the second channel conveyed under a lower pressure, which is a low-pressure hydraulic fluid, is supplied separately to the brake actuator and the two-speed switching valve.

2. The hydraulic motor unit of claim 1, further comprising:
a low-pressure selector valve connected to the first channel and the second channel; and
at least one proportional valve connected to a third channel downstream of the low-pressure selector valve,
wherein the low-pressure hydraulic fluid is supplied separately to the brake actuator and the two-speed switching valve through a pilot channel connected to the at least one proportional valve.

3. The hydraulic motor unit of claim 2,
wherein the hydraulic motor is connected in a closed circuit with a hydraulic pump connected to the first channel and the second channel to form an HST circuit, and
wherein the at least one proportional valve is housed inside the HST circuit.

4. The hydraulic motor unit of claim 3
wherein the at least one proportional valve comprises one proportional valve, and
wherein the pilot channel is branched in a middle thereof to supply the low-pressure hydraulic fluid to the brake actuator and the two-speed switching valve.

5. The hydraulic motor unit of claim 2,
wherein the at least one proportional valve comprises one proportional valve, and
wherein the pilot channel is branched in a middle thereof to supply the low-pressure hydraulic fluid to the brake actuator and the two-speed switching valve.

6. A hydraulic motor unit, comprising:
a hydraulic motor having an output shaft and a brake for braking the output shaft;
a two-speed switching valve for switching a speed of the output shaft; and
a brake actuator for releasing braking of the brake,
wherein the hydraulic motor is connected to a first channel and a second channel each conveying a hydraulic fluid for driving by a hydraulic pump, and the hydraulic motor is connected in a closed circuit with the hydraulic pump to form an HST circuit, and
wherein the hydraulic motor unit further comprises:
a low-pressure selector valve connected to the first channel and the second channel and configured to select a low-pressure hydraulic fluid under a lower pressure from the hydraulic fluids conveyed by the first channel and the second channel; and
one proportional valve connected to a third channel downstream of the low-pressure selector valve and housed inside the HST circuit, and
wherein the hydraulic fluid under a lower pressure is branched and supplied to the brake actuator and the two-speed switching valve through a pilot channel connected to the proportional valve.

* * * * *